(12) United States Patent
Zhou et al.

(10) Patent No.: US 7,827,459 B1
(45) Date of Patent: Nov. 2, 2010

(54) COMMUNICATIONS PROTOCOL

(75) Inventors: Xiaoming Zhou, Sunnyvale, CA (US);
John S. Baras, Potomac, MD (US)

(73) Assignee: University of Maryland, College Park, College Park, MD (US)

( * ) Notice: Subject to any disclaimer, the term of this patent is extended or adjusted under 35 U.S.C. 154(b) by 964 days.

(21) Appl. No.: 11/651,314

(22) Filed: Jan. 8, 2007

Related U.S. Application Data

(60) Provisional application No. 60/743,113, filed on Jan. 10, 2006.

(51) Int. Cl.
*H04L 1/18* (2006.01)

(52) U.S. Cl. ...................... 714/749; 714/774

(58) Field of Classification Search ................ 714/749, 714/774
See application file for complete search history.

(56) References Cited

U.S. PATENT DOCUMENTS

| | | | | |
|---|---|---|---|---|
| 6,111,892 A | * | 8/2000 | Rittle et al. ................. | 370/465 |
| 6,992,982 B1 | * | 1/2006 | Meyer et al. ................. | 370/231 |
| 6,996,083 B1 | * | 2/2006 | Balachandran et al. ...... | 370/337 |
| 6,996,763 B2 | * | 2/2006 | Sarkar et al. ................. | 714/749 |
| 7,024,611 B2 | * | 4/2006 | Chen et al. ................... | 714/751 |
| 7,096,400 B2 | * | 8/2006 | Lim et al. .................... | 714/748 |
| 7,512,860 B2 | * | 3/2009 | Miyazaki et al. ............. | 714/751 |
| 7,519,084 B2 | * | 4/2009 | Mangin et al. ............... | 370/474 |
| 2002/0165973 A1 | * | 11/2002 | Ben-Yehezkel et al. ...... | 709/230 |
| 2003/0039227 A1 | * | 2/2003 | Kwak .......................... | 370/330 |
| 2003/0174700 A1 | * | 9/2003 | Ofek et al. ................... | 370/389 |
| 2004/0190552 A1 | * | 9/2004 | Kim et al. .................... | 370/469 |
| 2006/0203924 A1 | * | 9/2006 | Casaccia et al. ............. | 375/260 |

* cited by examiner

*Primary Examiner*—M. Mujtaba K Chaudry

(57) ABSTRACT

The present invention relates to an improved communications protocol which increases the efficiency of transmission in return channels on a multi-channel slotted Alohas system by incorporating advanced error correction algorithms, selective retransmission protocols and the use of reserved channels to satisfy the retransmission requests.

12 Claims, 2 Drawing Sheets

COMMUNICATIONS PROTOCOL

CROSS-REFERENCE TO RELATED APPLICATIONS

This application claims the benefit of U.S. Provisional Application No. 60/743,113 filed on 10 Jan. 2006, which is fully incorporated herein by reference.

STATEMENT REGARDING FEDERALLY FUNDED SPONSORED RESEARCH OR DEVELOPMENT

The U.S. Government has certain rights in this invention pursuant to Grant No. NCC 8235 awarded by the National Aeronautics and Space Administration (NASA).

SEQUENCE LISTING

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention relates to an improved telecommunications protocol for networks having relatively long propagation times which enables more efficient communication. More specifically the present invention relates to the area of satellite communication protocols for a return satellite channel with special features to increase the efficiency of transmission.

Satellite networks may often be configured such that there are many very small aperture terminals (VSAT's) in communication with one Hub. Signals are sent from the hub to the VSAT's (and vice versa) via a communications satellite. Signals from the hub to the VSAT's are referred to as forward signals. Signals sent via a communications satellite from the VSAT's to the hubs are referred to as the reverse or return signals.

Hub to VSAT communication typically utilizes a broadcast mode protocol. In broadcast mode the hub sends out a single transmission which is received by the satellite and relayed to all of the terminals. The packets that are sent will include information identifying the intended recipient. All of the terminals will examine the identifying information and only the terminal that is the intended recipient will keep the message and pass it back up through the various protocol layers as provided for by the International Standards Organization's Open System Interconnect (ISO-OSI) 7-layer networking standard.

It is important to note in the satellite communications systems as just described, communication in the forward direction is a one-to-many communication and that there is no contention for access on the forward channel because there is only one transmitting entity. However, the return channel which has many remote terminals utilizing the return channel, contention, access and efficient use of the return channel or channels is a significant issue. As shown in the left hand portion of FIG. 1, Hub 105 can transmit on the forward channel to one or more VSAT's 110. As shown in the right hand portion of FIG. 1, one or more VSAT's can transmit on the reverse or return channel(s) to the Hub. An increase in the efficiency of utilization of the return channel can provide a major increase in the overall system throughput.

Because of the planetary physics involved, the orbits for geostationary satellites must be approximately 22,300 miles above the surface of the earth and the propagation delay for signals from the Hub to satellite to VSAT's (or vice versa) are all in the range of about 250 milliseconds. This delay is only the delay due to the radiofrequency propagation time and does not include any delay caused by other factors such as protocol overhead, packet collisions or packet retransmissions.

This propagation delay introduces significant complications when designing a network to efficiently transfer data in the shortest possible time. Because propagation times in hardwired networks are relatively short, there are a number of design options to deal with transmission errors. One solution is to have the receiver send to the transmitter an acknowledgement packet (ACK) after the proper receipt of each packet. Because propagation times on wired or short range radio, network protocols such as Ethernet are essentially instantaneous, sending an ACK and a possible retransmission of each packet is a reasonable way to deal with missed packets. However, with propagation delays of at least 250 milliseconds, sending an ACK for each original packet sent would increase greatly the time needed to transfer each packet, as well as the whole message.

Multi-channel slotted Aloha (MCSA) networks are a standard method of implementing reverse satellite communications. MCSA is derived from the original ALOHAnet developed by Norman Abramson, working at the University of Hawaii. Abramson set up a packet radio network to connect terminals on the various Hawaiian Islands. Under the original protocol, there was a single outgoing frequency for broadcast communications from the hub to the remote terminals and a single, multi-access incoming frequency for communications from the remote terminals to the hub. Each remote terminal would transmit when it had data to send. If there were no collisions, i.e. simultaneous or partially overlapping transmissions, the terminal would receive a copy of that packet back from the hub on the broadcast frequency and know that its original outgoing transmission was successful. If no copy were received, this would be recognized as an error and the sending terminal would just send the packet again.

As used herein, the term "Aloha-type communications protocol" refers to a protocol having a forward channel one-to-many communications link (one hub to many terminals) and a reverse channel many-to-one communications link (same set of terminals communicating to the same hub).

A collision occurs when two or more remote terminals send their packets so that there is at least some overlap in the transmission of the two signals. For proper receipt of each packet, there needs to be only one remote terminal transmitting for the whole period of time that it takes for the one packet to be transmitted. If a second remote terminals starts to transmit at anytime during the transmission of the first terminal's packet, then the signals will overlap, collide and interfere with each other, and neither terminal's transmissions will be received correctly.

Each packet contains in internal error detection code, typically using a cyclic redundancy check (CRC), parity bit, or a checksum protocol. The hub will recalculate the values of these error detection protocols and compare them to the error detection bits that have been added to each packet. If the results are the same, then the packet is assumed to have been received correctly and it is then broadcast over the forward frequency to all of the remote terminals. If the error detection checking indicates that there was an error, then that indicates a collision between two or more packets.

If there were a collision, that would indicate that at least two terminals were attempting to transmit on the return frequency at the same time. In order to minimize the possibility of a second collision, each terminal waits a random period of time before attempting retransmission. This aids significantly in reducing collisions on retransmissions.

A modified version, called Slotted ALOHA, was introduced to increase efficiency. The hub would send out a timing pulse which created time slots. Any terminal that had data to send had to transmit within a predetermined period after receipt of the pulse. This modification increased efficiency by limiting the possibly for a collision to only the small scheduled period of time after the timing pulse.

The next expansion of the ALOHA protocol was a multi-channel slotted ALOHA (MCSA). This protocol includes multiple reverse channels for communication from the remote terminals to the hub.

These multiple channels can be accomplished by several means. Two of the most common methods are the spread spectrum technology methods of Direct Sequence Spread Spectrum (DS/SS) and Frequency Hopping Spread Spectrum (FHSS).

In addition, the reverse channels of MCSA can be implemented using series of narrowband channels each operating on separate frequency.

In either case, the addition of multiple channels to the ALOHA protocol, reduces the chance for collision by having more data paths available for original transmissions and retransmission of lost packets. Just like original transmissions, retransmissions use a random access contention access method to the reverse channels.

If we assume all the channels are operating at the same low load of G=0.1 and a message length equal to nine slots, the probability of success on the first transmission attempt is only 0.41. This means that only 41% of the messages can be delivered in the first try, i.e. with propagation delay of 250 ms. The remaining 59% of the messages will incur retransmissions and the message delay will be at least 750 ms (include the timeout period and another round trip propagation delay). Therefore in a GEO satellite network with a large propagation delay, the multi-channel slotted Aloha cannot deliver multi-slot short messages very quickly.

BRIEF SUMMARY OF THE INVENTION

Internet traffic is shifting to shorter transaction based communications to accommodate such activities as retail Point-of-Sale (POS) transactions, mouse clicks, http requests and Transmission Control Protocol (TCP) synchronization packets. In order to decrease message latency a three-step improvement is implemented. One is to use a packet level forward error correction (PLFEC) protocol which will increase the number of the messages that can be reconstructed by the hub without retransmission. The second step is to implement a selective retransmission algorithm so that if the number of packets lost is too large for reconstruction, then only the minimum number of packets needed for reconstruction by the PLFEC protocol is retransmitted. The third step is to reserve one or more of the return channels of the MCSA for the retransmissions, which essentially guarantees that the minimum number of packets needed for reconstruction of the message will be received on the second transmission.

BRIEF DESCRIPTION OF THE SEVERAL VIEWS OF THE DRAWINGS

Having just described the invention in general terms, other and further objects, features, and advantages of the invention will be made more explicit from the following detailed description taken with reference to the drawings, which are not necessarily drawn to scale, and wherein.

DETAILED DESCRIPTION OF THE INVENTION

Figure 1:
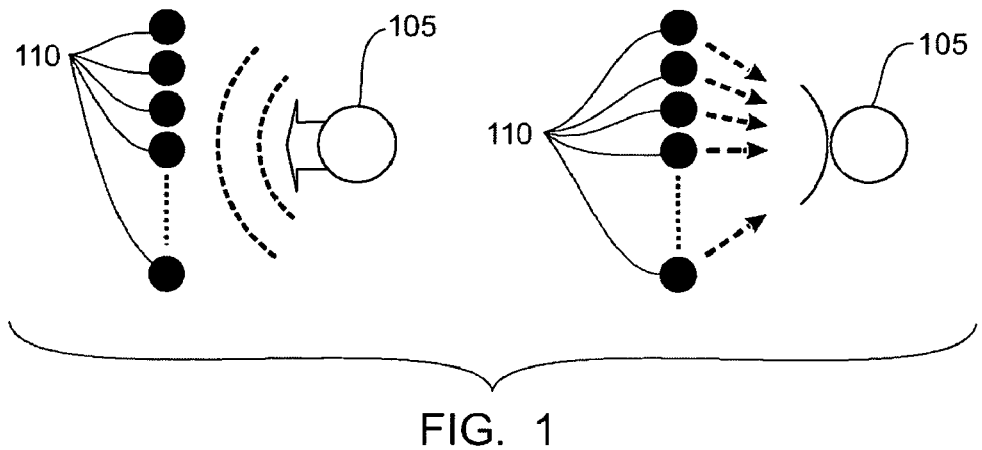
FIG. 1 is a diagrammatic depiction of a general satellite communication configuration of the prior art.

The following discussion is premised on the use of geostationary satellites. Though such use would be typical, the scope of the present invention is not predicated on use with geostationary satellites.

1. Forward Error Correction and Automatic Repeat Requests

PLFEC is a technique that allows for the reconstruction of missed packets when messages of k packets need to be transmitted. Forward error correction refers to an encoding scheme that allows the entire original message to be reconstructed without necessarily having received the entire encoded message. Once the minimum number of packets needed to reconstruct the message is received, the remainder of the packets in the message can be ignored.

A PLFEC encoding scheme generates parity information which is assembled into parity packets based upon various bits from each of the packets in a message. For example, an encoding scheme might generate a first byte of a parity packet based upon an encoding scheme which utilizes the first byte of each packet in the message. This is referred to as an intra-packet encoding scheme.

An original message of k packets in length is encoded under a PLFEC algorithm to generate a total number of n packets of which a variable number are parity packets. Then the k original message packets are sent first, followed by the (n-k) parity packets. Though it is more efficient to send the k original packets first, that isn't necessarily required, and the packets could be sent in any order.

A typical encoding scheme can be described as FEC(20, 9) which indicates that the original message was 9 (k) packets long and was encoded to a total of 20 (n) packets, which means that there were 11 (n-k, 20–9) parity packets. Any number of other encoding ratios can be used, including but not limited to FEC (27, 9), FEC (34, 9), FEC (18, 6) or FEC (36, 12). The preferred encoding scheme utilizes an n:k ratio of about 1:1.5 to about 1:4.

The noisier the communications environment, the higher the encoding ratio that should then be used. Thus an FEC (34, 9) encoding ratio would be more appropriate for a very noise environment, because only 9 out the 34 encoded packets would need to be received in order to reconstruct the message.

The advantage of PLFEC is that even though a total of 20 packets may be sent, only 9 need to be received without error in order for the message to be reconstructed by the Hub (assuming a FEC(20,9) encoding ratio). The total of 9 packets could be any number of original message packets and any number of parity packets, as long as the total equals 9. Once the Hub has received the minimum number of packets have been received correctly, an ACK is sent to the transmitting VSAT. Under this protocol, an ACK is only sent after the entire original message has been received or reconstructed.

Because error correction can be accomplished, even if some packets are not received correctly, having the hub send an ACK after receipt of each packet would be a very inefficient, especially considering the long propagation delay times for satellite communications.

Each ACK transmission would require at least an additional 250 milliseconds and in view of the error correction capabilities provide by PLFEC, would be unnecessary in almost all circumstances.

Even if there were a collision rate of 55%, a 20-packet encoded message that had been encoded with a FEC(20, 9) scheme, could still be reconstructed because on average, 9 packets would still arrive correctly. Thus only the original transmission time would be required.

If the same collision rate were applied to a 9-packet non-encoded message under MCSA, then about 5 packets would suffer collisions, and there a significant additional time delay which would include time-out periods, re-transmission of each of the missed packets and subsequent ACK transmissions.

The transmission status of each message can fall into one of three possible categories:

Category 1: If at least k packets of the encoded message are received correctly, then all k of the original message packets have been either received correctly or the message can be reconstructed by utilizing the parity packets if some of the original message packets have been lost. In this case there is no need for a retransmission.

Category 2: A second alternative is that some of the packets have been received, but not enough to properly reconstruct the message. This occurs if less than k packets out of the total n are received correctly. In this case a selective retransmission strategy is utilized. Each of the transmitted packets contains information regarding the message ID number, the packet sequence number and total packets in the message. If even one packet of the message is received properly by the hub, then hub can determine which packets are missing. The hub then reserves one or more of the return channels and sends an Acknowledgement Request (ARQ) to the proper VSAT to retransmit only those missing packets on the identified reserved channel. Because a specific channel have been reserved for this ARQ only, there won't be any collisions and the balance of the needed packets will then be received by the hub on the second transmission attempt.

Figure 2:
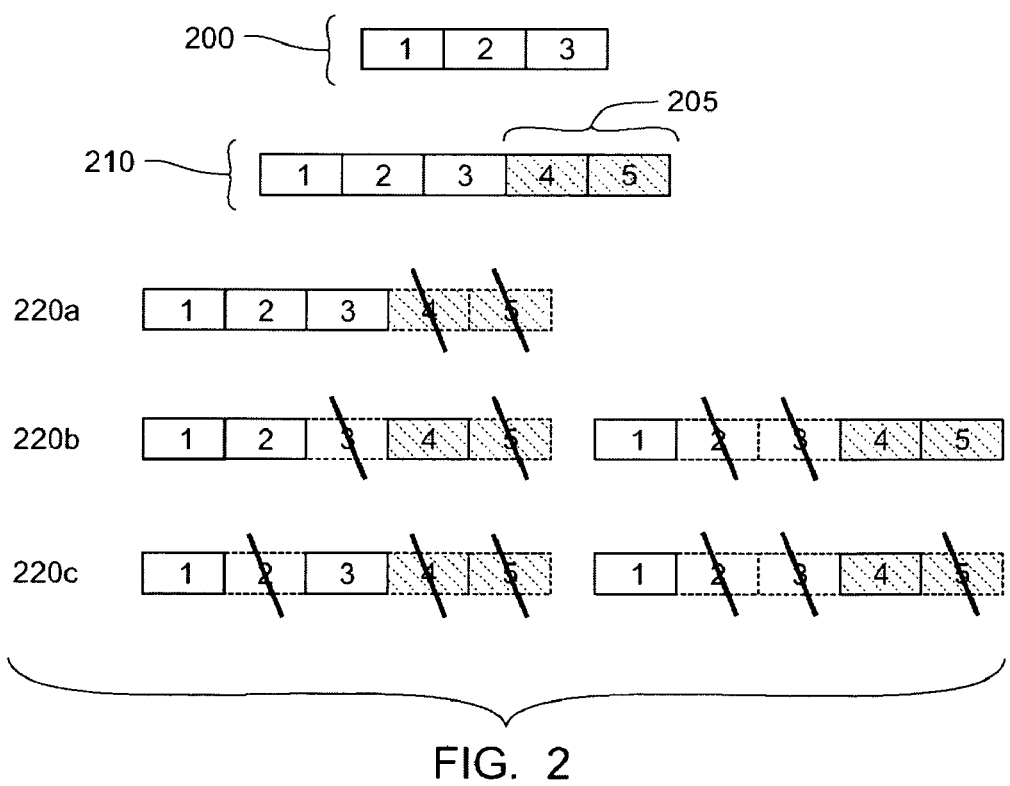
FIG. 2 is a diagrammatic depiction of the Packet Level Forward Error Correction protocol as used in the present invention.

The following discussion is based upon a sample encoding scheme of FEC (5, 3) and is shown in FIG. 2. A three-packet message 200 is encoded into five code packets 210, which includes the original 1-3 message packets 200 and two parity packets 205 numbered 4 and 5. The encoded message is sent in five consecutive time slots on one of the return channels.

If the two parity packets 4 and 5 are lost due to collisions (220a), then no error correction is needed and no retransmission is needed because all of the original message packets have been received.

If two packets are lost and one or both of them are original message packets, (two examples are shown in 220b), then the hub can utilize the PLFEC encoding protocol to reconstruct the message without the need for a retransmission. This is possible because at least three (k) packets were received correctly.

The last option occurs when three of the n encoded packets are lost due to collision. For example, if only the first (original message) and the fourth (parity) code packets ($2^{nd}$ example in 220c) are received correctly, the hub will be able to determine from the correctly received packets, that the message length is three (k) and that the hub needs one more packet to in order to reconstruct the message. It then reserves one channel for this retransmission. After the terminal receives the information regarding which channel has been reserved for this ARQ, it sends an additional code packet such as the first code packet on the reserved channel so that the hub will be able to reconstruct the message after it receives this one additional packet on retransmission.

The first example in 220c shows that only two original message packets (1 and 3) were received. Therefore, if the ARQ requests that packet 2 be retransmitted, no reconstruction of the message would be necessary upon receipt of the retransmitted packet 2. However, if packet 4 or 5 were requested in the ARQ, then the PLFEC protocol would be necessary to reconstruct the original message. There are advantages to each option, and the protocol can be implemented to allow various choices during configuration of the protocol about which type of packet(s) to be re-transmitted.

Category 3: The third alternative is that none of n encoded packets are successfully transmitted to the hub (not shown). The hub has received no information that this message even exists. In this case, the VSAT will never receive either an ACK or an ARQ from the hub. After a defined time-out period, the VSAT will start over and retransmit all of the packets again. In essence, the first transmission never occurred.

Figure 3:
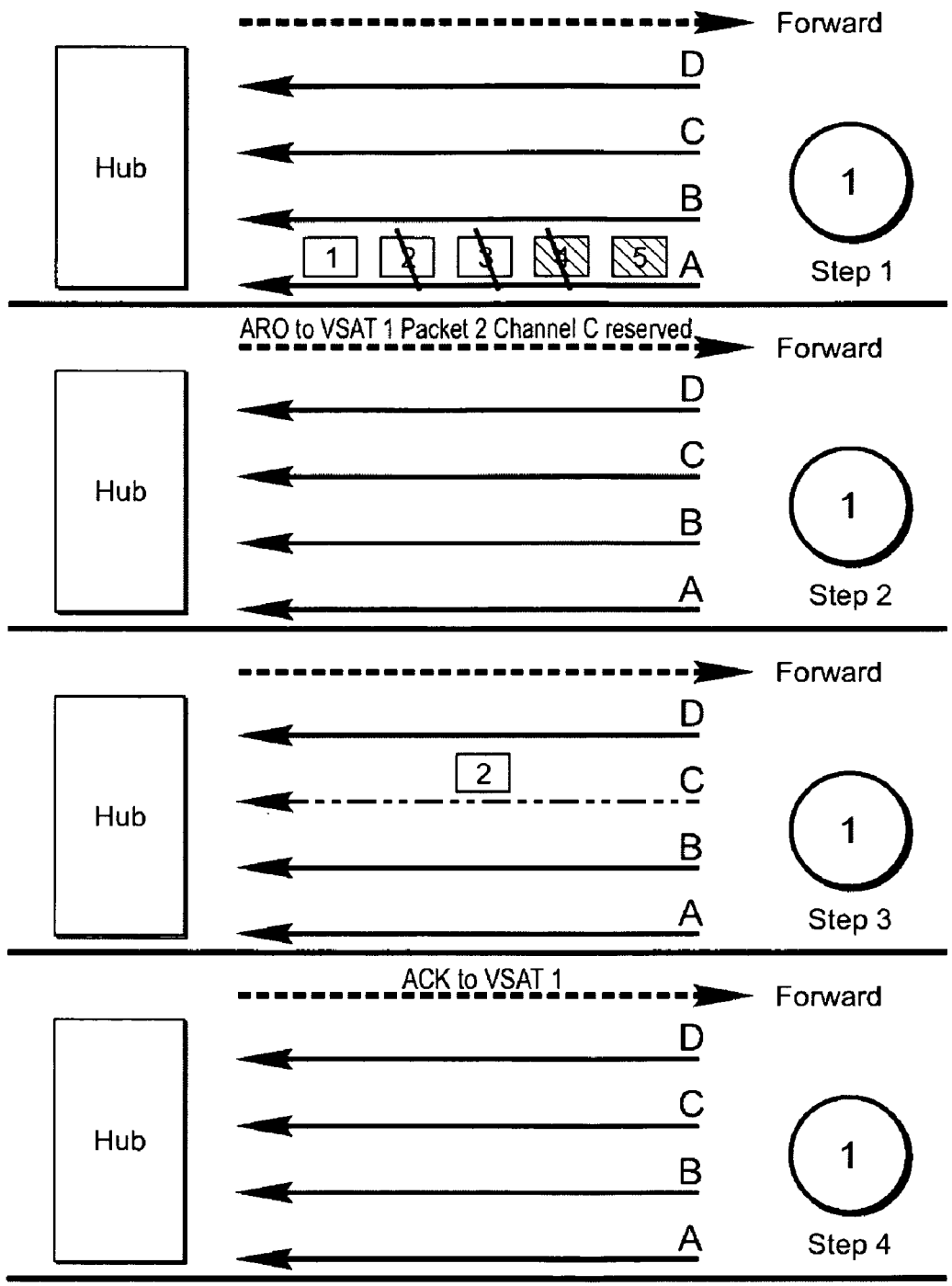
FIG. 3 is a diagrammatic depiction of the enhanced satellite communications protocol of the present invention.

FIG. 3 shows all of the steps of the present invention. Step 1 shows VSAT 1 sending an FEC encoded 5-packet message to the Hub on Channel A. As indicated, packets 2, 3 and 5 were subject to collisions and were not received without error.

Step 2 shows the Hub sending an ARQ to VSAT 1 to resend packet 2 using channel C which as been reserved.

Step 3 shows VSAT 1 retransmitting packet 2 on reserved channel C. Because channel C is reserved, it is essentially guaranteed that packet 2 will be receive by the Hub correctly. Then, by use of the PLFEC protocol, the original message can be reconstructed by the Hub Step 4. Once the message has been reconstructed correctly, the Hub sends an ACK to VSAT 1. Alternatively, if the message couldn't be reconstructed, for any reason, then the Hub could either send another ARQ to request at least k packets of the original encoded message be retransmitted or do nothing, in which case VSAT 1 would time out because it hadn't received an ACK and would retransmit the message de novo.

It should be understood that even though the enhanced communications protocol of the present invention is most efficient when used with shorter messages, it does provide enhanced efficiency even with longer messages. It should also be understood that the protocol of the present invention does not have to be used in isolation and could be used as one of combination of protocols in order to provide even more efficient communication.

Even though the present invention has been discussed as part of a satellite communications protocol, it's improvement in communications can be utilized in any communications application in which there are inherent propagation delays.

To those skilled in the art it will be understood that there can be many other variations of the embodiments what have been described above while still achieving the same objectives of the invention. Such variations are intended to be covered by the scope of this invention. As such, the foregoing description of embodiments of the invention is not intended to be limiting. Accordingly, it is intended that the appended claims will cover all modifications of the invention that fall within the true spirit and scope of the invention.

What is claimed is:

1. A method of transmitting a Media Access Control (MAC) layer message that is k packets in length from one of a plurality of terminals to a hub station over a multi-channel slotted Aloha-type network wherein the improvement comprises:

a) encoding the k message packets using a packet-level forward error correction protocol to generate a total of n encoded packets wherein n-k packets are parity packets;

b) transmitting the n encoded packets to the hub over the shared medium;

c) determining the number of packets correctly received by the hub (m); and performing one of the following steps:
  i. if m is equal to or greater than k, send an ACK from the hub to the sending terminal; or
  ii. if $0 \leq m \leq k$ then send an ARQ from the hub to the sending terminal, said ARQ comprises an authorization to reserve a return channel for the retransmission from the sending terminal of at least k-m packets of the original m packets that were not properly received in the initial transmission and the retransmission by the terminal, over the reserved channel, of at least k-m packets of the original m packets of the original transmission that were not properly received.

2. A method of transmitting a Media Access Control (MAC) layer message that is k packets in length from one of a plurality of terminals to a hub station over a multi-channel slotted Aloha-type network as described in claim 1 wherein the FEC algorithm utilizes a Reed-Solomon erasure algorithm.

3. A method of transmitting a Media Access Control (MAC) layer message that is k packets in length from one of a plurality of terminals to a hub station over a multi-channel slotted Aloha-type network as described in claim 1 wherein the FEC algorithm is a Viterbi algorithm.

4. A method of transmitting a Media Access Control (MAC) layer message that is k packets in length from one of a plurality of terminals to a hub station over a multi-channel slotted Aloha-type network as described in claim 1 wherein the normal propagation delay from hub to terminals is at least about 500 milliseconds.

5. A method of transmitting a Media Access Control (MAC) layer message that is k packets in length from one of a plurality of terminals to a hub station over a multi-channel slotted Aloha-type network as described in claim 1 wherein the original MAC layer message length (k) is in the range of about 400 bytes to about 1500 bytes.

6. A method of transmitting a Media Access Control (MAC) layer message from a plurality of terminals to a hub station over a multi-channel slotted Aloha-type network as described in claim 1 wherein communication between said hub and said terminals is by satellite.

7. A method of transmitting a Media Access Control (MAC) layer message from a plurality of terminals to a hub station over a multi-channel slotted Aloha-type network as described in claim 6 wherein said satellites are in a geostationary orbit.

8. A method of transmitting a Media Access Control (MAC) layer message that is k packets in length from one of a plurality of terminals to a hub station over a multi-channel slotted Aloha-type network as described in claim 1 wherein essentially all messages are fully transmitted in one or two attempts.

9. A method of transmitting a Media Access Control (MAC) layer message that is k packets in length from one of a plurality of terminals to a hub station over a multi-channel slotted Aloha-type network as described in claim 1 wherein essentially all messages are fully transmitted in one or two attempts at a system S value of about 0.4.

10. A method of transmitting a Media Access Control (MAC) layer message that is k packets in length from one of a plurality of terminals to a hub station over a multi-channel slotted Aloha-type network as described in claim 1 wherein about 50% of all messages are fully transmitted in one attempt at a system S value of about 0.4.

11. A method of transmitting a Media Access Control (MAC) layer message that is k packets in length from one of a plurality of terminals to a hub station over a multi-channel slotted Aloha-type network as described in claim 1 wherein the network does not become saturated at S values of 0.4 or less.

12. A method of transmitting a Media Access Control (MAC) layer message that is k packets in length from one of a plurality of terminals to a hub station over a multi-channel slotted Aloha-type network as described in claim 1 wherein the ratio of n to k, in the FEC encoding scheme is about 1.5 to about 4.

* * * * *